United States Patent
Wu

(10) Patent No.: US 7,287,209 B2
(45) Date of Patent: Oct. 23, 2007

(54) SYSTEM AND METHOD FOR DETECTING CODEWORD ERRORS IN ERROR CORRECTION CODE OR CYCLIC REDUNDANCY CHECK CODE

(75) Inventor: Sheng-Hung Wu, Hsinchu (TW)

(73) Assignee: Cheertek, Inc., Hsinchu (TW)

( * ) Notice: Subject to any disclaimer, the term of this patent is extended or adjusted under 35 U.S.C. 154(b) by 692 days.

(21) Appl. No.: 10/859,570

(22) Filed: Jun. 3, 2004

(65) Prior Publication Data

US 2005/0273690 A1    Dec. 8, 2005

(51) Int. Cl.
*H03M 13/00* (2006.01)

(52) U.S. Cl. .................................. 714/781
(58) Field of Classification Search ............. 714/781, 714/785–786
See application file for complete search history.

(56) References Cited

U.S. PATENT DOCUMENTS 5,936,978 A * 8/1999 Ramesh et al. ............ 714/762
6,427,219 B1 * 7/2002 Yang ........................ 714/758

OTHER PUBLICATIONS

Ho et al., Extended Kasami algorithm for cyclic codes, 1998, IEEE, p. 2834-2839.*

* cited by examiner

*Primary Examiner*—Shelly A Chase
(74) *Attorney, Agent, or Firm*—Finnegan, Henderson, Farabow, Garrett & Dunner LLP

(57) ABSTRACT

A method for detecting errors in data that comprises encoding the data into a codeword using a generation polynomial, transmitting the codeword over a channel, receiving the transmitted codeword, generating syndromes for the received codeword using the generation polynomial, the syndromes comprising a plurality of syndrome symbols, providing a plurality of syndrome windows, each of the syndrome windows comprising a plurality of sub-windows and corresponding to a set of syndrome symbols, determining a number of non-zero terms of sub-windows of each of the syndrome windows, and selecting at least one syndrome window having a least number of non-zero terms of sub-windows.

30 Claims, 3 Drawing Sheets

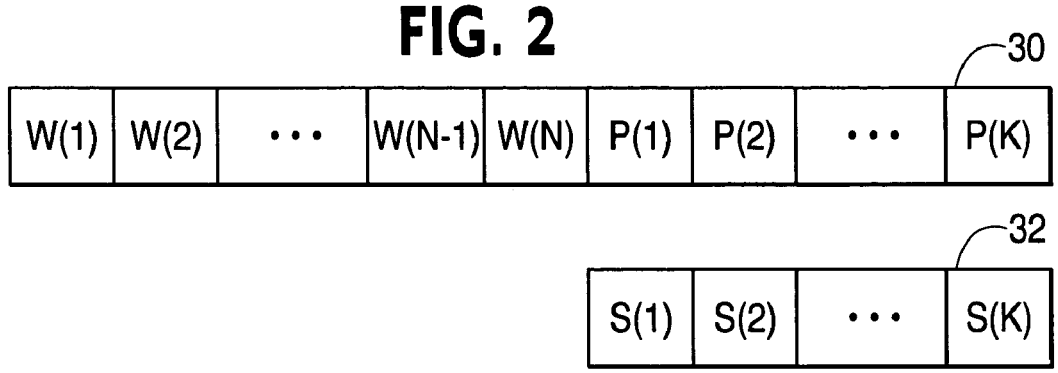
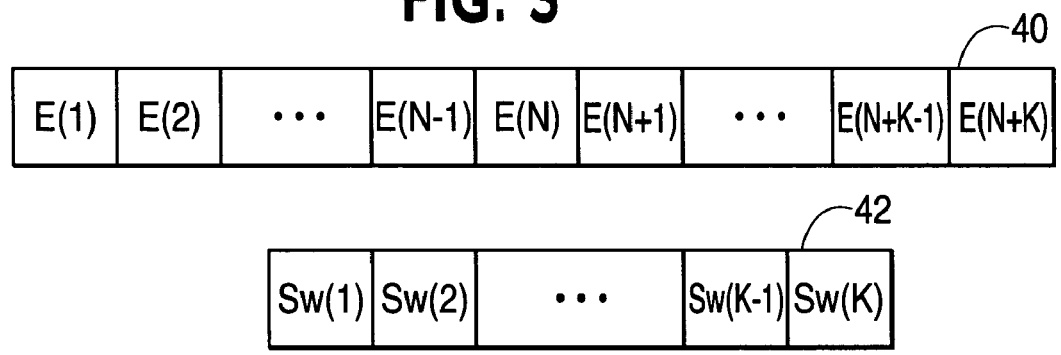
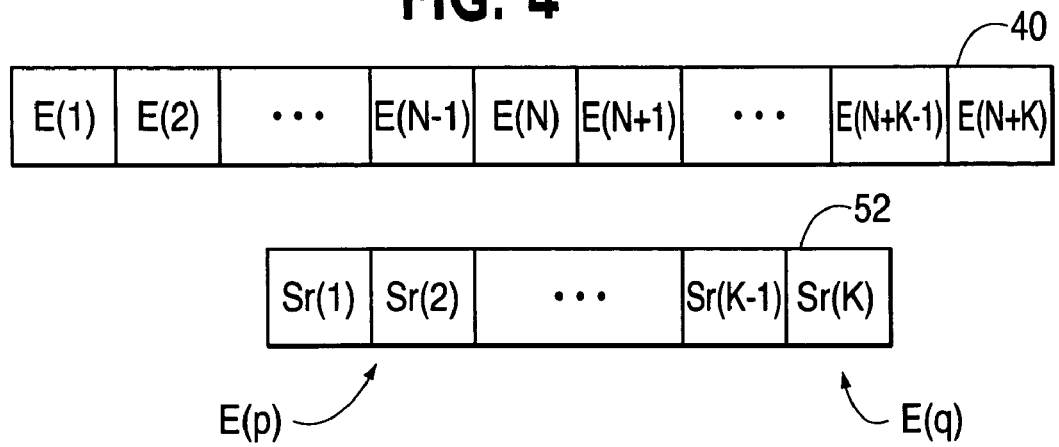

SYSTEM AND METHOD FOR DETECTING CODEWORD ERRORS IN ERROR CORRECTION CODE OR CYCLIC REDUNDANCY CHECK CODE

DESCRIPTION OF THE INVENTION

1. Field of the Invention

This invention relates in general to error correction and, more particularly, to a system and method for detecting errors in error correction code ("ECC") or cyclic redundancy check ("CRC") codewords.

2. Background of the Invention

A storage medium such as a digital video disc ("DVD") is subject to various types of distortion, noise and interference. Various errors may occur at the output of the storage medium. Error correction coding ("ECC") and cyclic redundancy check ("CRC") are generally used to overcome errors arising from the storage medium. Data transfer protocols in the art are established by a number of standards. These standards typically employ standard ways of formatting data in discrete frames or packets. A frame or packet usually includes a destination address, control bits for flow control, data or payload, and parity check in the form of CRC codes or ECC codes, as well as headers and trailers to identify the beginning and end of the frame or packet.

Typically, CRC is used to detect errors in data transmission without correcting the detected errors. Data can be deemed as a sequence of binary bits or a sequence of multi-bit symbols. A CRC is an additional code appended to the data prior to data transmission. CRCs are produced by an encoder in an encoding operation. In calculating CRCs, the data are treated as the coefficients of a polynomial and divided by another polynomial, for example, a generation polynomial. The division results in a quotient, which is ignored, and a remainder, which is kept to serve as a CRC. The data and the appended CRC together form a codeword which is then transmitted over a channel. The codeword received at a receiving end of the channel is compared to the original transmitted codeword. A discrepancy between the received and original transmitted codewords indicates a transmission error.

ECC is used to detect errors and correct the detected errors. A codeword produced by an encoder is made up of data symbols and parity symbols. The parity symbols are derived by dividing the data symbols by a generation polynomial. The remainder resulting from the division includes the parity symbols which in turn are appended to the data symbols. The codeword is then transmitted over a channel. A received codeword at a receiving end of the channel may contain errors. The received codeword is applied to a syndrome generator for generating a number of syndromes mathematically related to error locations and error values. If all of the syndromes are zero, the received and original codewords have no errors. If at least one symbol of the syndromes is non-zero, the received codeword is subject to further processing for error correction.

CRC and ECC techniques are deployed for detecting errors in data transmission systems. However, CRC is not fit for correcting detected errors, and ECC usually uses complex mathematics, which require significant computing resources, in detecting and correcting errors. It is thus desirable to have a system and method for detecting data errors with efficient use of computing resources.

SUMMARY OF THE INVENTION

Accordingly, the present invention is directed to a method for error detection that obviates one or more of the problems due to limitations and disadvantages of the related art.

To achieve these and other advantages, and in accordance with the purpose of the invention as embodied and broadly described, there is provided a method for detecting errors in data that comprises encoding the data into a codeword using a generation polynomial, transmitting the codeword over a channel, receiving the transmitted codeword, generating syndromes for the received codeword using the generation polynomial, the syndromes comprising a plurality of syndrome symbols, providing a plurality of syndrome windows, each of the syndrome windows comprising a plurality of sub-windows and corresponding to a set of syndrome symbols, determining a number of non-zero terms of sub-windows of each of the syndrome windows, and selecting at least one syndrome window having a least number of non-zero terms of sub-windows.

Also in accordance with the present invention, there is provided a method for detecting errors in data that comprises encoding the data into a codeword using a generation polynomial, transmitting the codeword over a channel, receiving the transmitted codeword, generating syndromes for the received codeword using the generation polynomial, providing a plurality of syndrome windows, each of the syndrome windows including a plurality of symbols and corresponding to an error pattern, selecting one of the syndrome windows, mapping into the selected syndrome window at least one symbol from at least one of the syndrome windows other than the selected syndrome window, and determining a number of non-zero terms in an error pattern corresponding to the mapped syndrome window.

Still in accordance with the present invention, there is provided a method for detecting errors in a codeword that comprises generating syndromes for the codeword using a generation polynomial, providing a plurality of syndrome windows, each of the syndrome windows including a plurality of symbols and corresponding to an error pattern, selecting one of the syndrome windows, mapping into the selected syndrome window at least one symbol from at least one of the syndrome windows other than the selected syndrome window, determining a number of non-zero terms in an error pattern corresponding to the mapped syndrome window, and repeating the steps of selecting, mapping and determining until all of the syndrome windows are selected and mapped.

Yet still in accordance with the present invention, there is provided a system for detecting errors in data that comprises an encoder for encoding the data into a codeword using a generation polynomial, a transmitter for transmitting the codeword over a channel, a receiver for receiving the transmitted codeword, a plurality of syndromes generated for the received codeword using the generation polynomial, the plurality of syndromes comprising a plurality of syndrome symbols, and a plurality of syndrome windows, each of the syndrome windows comprising a plurality of sub-windows and corresponding to a set of syndrome symbols, wherein a number of non-zero terms of sub-windows of each of the syndrome windows is determined.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 2 is a schematic diagram of a codeword and syndromes generated by the system shown in FIG. 1;

FIG. 3 is a schematic diagram of a trial error pattern and a syndrome window in accordance with an embodiment of the present invention; and FIG. 4 is a schematic diagram illustrating a method of error detection in accordance with another embodiment of the present invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1A:
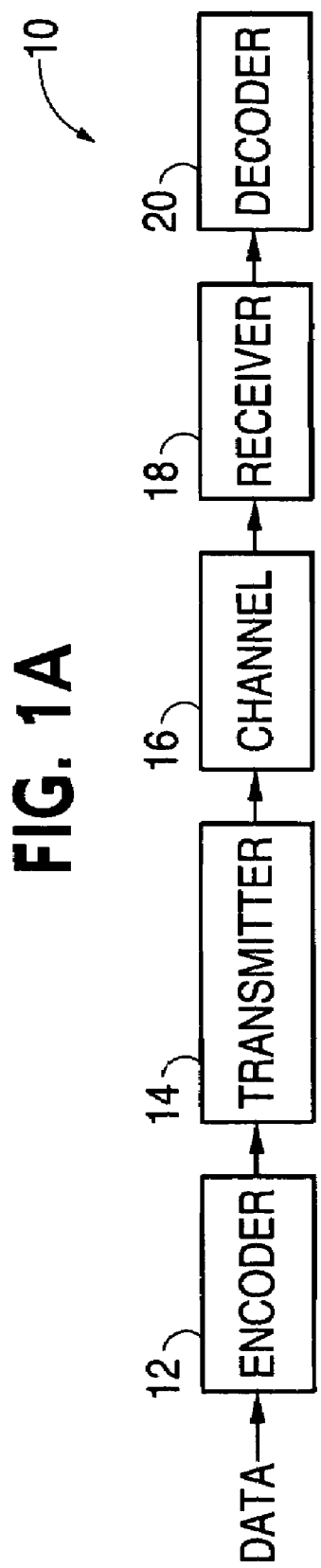
FIG. 1 is a schematic diagram of a system for detecting errors in data in accordance with an embodiment of the present invention.
Figure 1B:
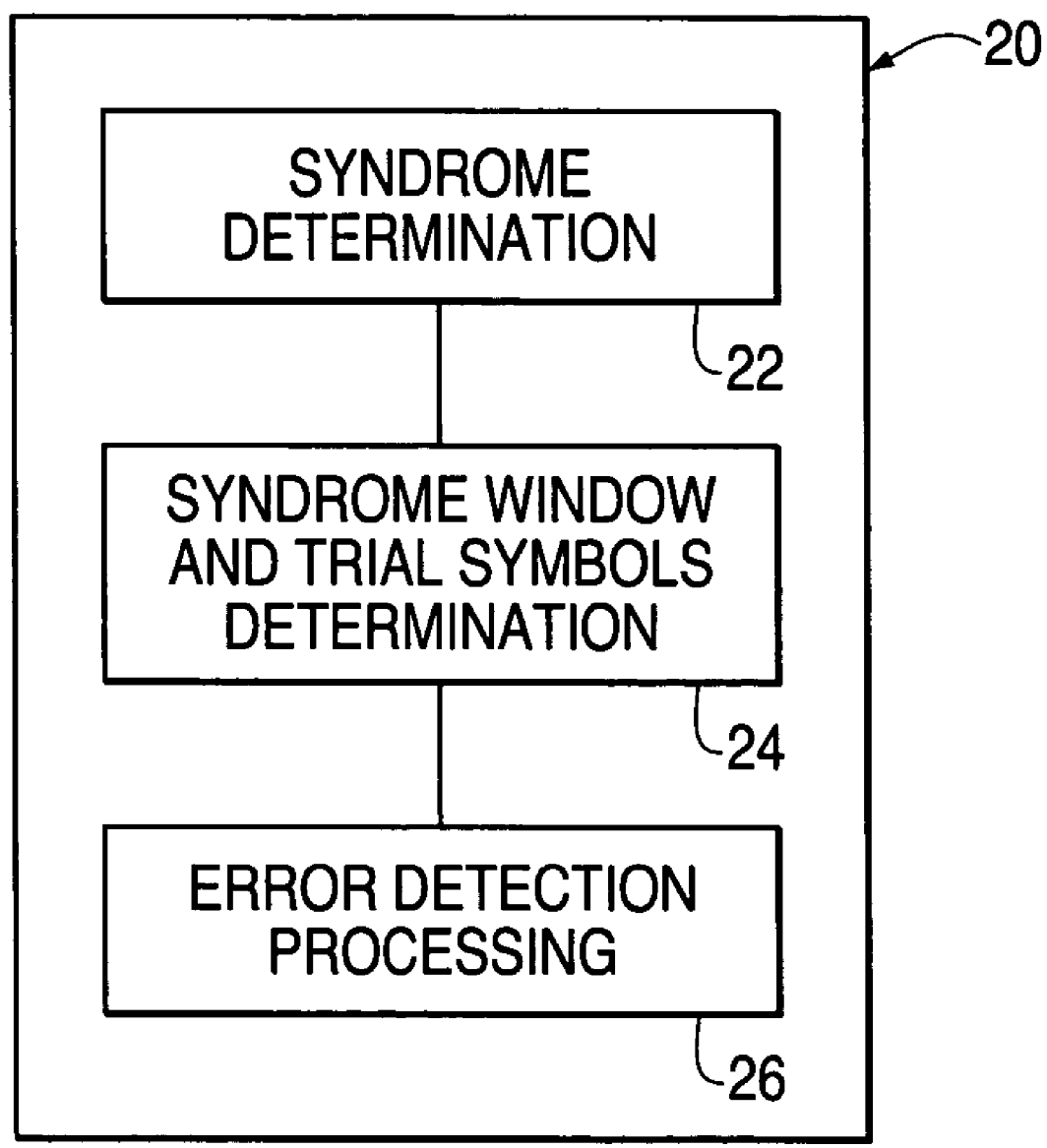

FIG. 1 is a schematic diagram of a system 10 for detecting errors in data in accordance with an embodiment of the present invention. System 10 includes an encoder 12, a transmitter 14, a channel 16, a receiver 18 and a decoder 20. Data in the form of a sequence of information bits are encoded by encoder 12 into a codeword, which includes data symbols and parity symbols. In generating parity symbols, a generation polynomial is used to divide the data symbols. The remainder resulting from the division serves as parity symbols which in turn are appended to the data symbols. The generation polynomial may either take a descending form, for example, $x^K = x^{K-1} + \ldots + x + 1$, where higher degrees of x are descended to lower degrees, or an ascending form, for example, $1 = x + \ldots + x^{K-1} + x^K$, where lower degrees of x are ascended to higher degrees. The number of terms of the parity symbols is therefore not greater than the highest degree K of the generation polynomial. Transmitter 14 transmits the codeword over channel 16. The transmitted codeword is received by receiver 18 and then decoded in decoder 20.

FIG. 2 is a schematic diagram of a codeword 30 and syndromes 32 generated by system 10 shown in FIG. 1. Codeword 30, denoted as (N+K, N, K), includes N data symbols W(1) to W(N), and K parity symbols P(1) to P(K), where N and K are integers, and W(1) to W(N) and P(1) to P(K) are coefficients. Each of the data symbols W(1) to W(N) and parity symbols P(1) to P(K) has a same bit-length. In mathematical form, codeword 30 may be expressed as follows.

$$W(1)x^{N+K-1} + W(2)x^{N+K-2} + \ldots + W(N)x^K + P(1)x^{K-1} + \ldots + P(K)$$

The received codeword is undergone a syndrome generation process in decoder 20 using the generation polynomial for calculating syndromes 32. Syndromes 32 generated by the generation process includes K syndrome symbols S(1) to S(K). Each of the syndrome symbols S(1) to S(K) further includes syndrome values. If all of the syndrome symbols or syndrome values equal to zero, the received codeword is valid and codeword 30 is, with high probability, uncorrupted.

FIG. 3 is schematic diagram of a trial error pattern 40 and a syndrome window 42 in accordance with an embodiment of the present invention. An error pattern refers to a set of solutions to data errors, if any. An error pattern is derived by further processing syndromes by mathematical calculation. The present invention provides a system and method for locating codeword errors by detecting syndrome errors. Trial error pattern 40 consistent with the present invention is not derived directly from mathematic calculation, which is particularly advantageous in detecting short ECC/CRC codewords. Trial error pattern 40 includes error symbols E(1), E(2) . . . E(N+K), which correspond to the N+K symbols of codeword 10.

Syndromes 32 are location-related to error symbols E(1), E(2) . . . E(N+K) of trial error pattern 20. Referring to FIG. 3, syndrome window 42 includes a set sub-windows Sw(1), Sw(2) . . . and Sw(K), where K is the highest degree of the generation polynomial, and w is an index related to window location. For example, when w equals 1, a first syndrome window is provided including sub-windows $S_1(1)$, $S_1(2)$ . . . and $S_1(K)$ which relate to a first set of syndrome symbols. When w equals 2, a second syndrome window is provided including sub-windows $S_2(1)$, $S_2(2)$ . . . and $S_2(K)$ which relate to a second set of syndrome symbols. Each set of sub-windows corresponds to a trial error pattern.

In one aspect, for non-cyclic codewords having N+K symbols, a total number of N+1 syndrome windows 42 are provided. That is, the index w ranges from 1 to N+1. For cyclic codewords having N+K symbols, a total number of N+K syndrome windows 42 are provided. The index w ranges from 1 to N+K. If all syndrome values of syndromes 32 are zero, all of the sub-windows of syndrome windows 42 are zero, too. If any one syndrome value of syndromes 32 is not zero, each of syndrome windows 42 contains at least one non-zero sub-window.

The number of non-zero sub-windows of all syndrome windows 42 is then determined. N+1 syndrome windows of a non-cyclic codeword or N+K syndrome windows of a cyclic codeword are detected for non-zero sub-windows. In determining an error location or an error symbol, a maximum likelihood analysis is performed for selecting a syndrome window that has the least number of non-zero sub-windows. If more than one syndrome windows have the least number of non-zero sub-windows, these syndrome windows are determined to include information of error location.

FIG. 4 is a schematic diagram illustrating a method of error detection in accordance with another embodiment of the present invention. A syndrome window 52 at a window location w=r including sub-windows Sr(1), Sr(2) . . . and Sr(K) is selected as a process window. At least one symbol E(p) or E(q), which serves as a trial symbol, is mapped to syndrome window 52. Trial symbols E(p) and E(q) are related to other syndrome windows at locations w=p and w=q, respectively, and each corresponds to an error symbol in a trial error pattern corresponding to the syndrome window at location w=p or w=r. In an example of a 4-bit trial symbol, at least one of trial values from 0001 to 1111 is mapped. For non-cyclic or cyclic codewords having N+K symbols, a total number of N trial symbols are allowed to map into the current syndrome window 52. Mapping a trial symbol into a syndrome window may change the number of non-zero terms in the mapped syndrome window, and in turn change the number of non-zero terms in a trial error pattern corresponding to the mapped syndrome window. The number of non-zero terms in a trial error pattern corresponding to the selected syndrome window mapped with the at least one trial symbol is calculated.

Another syndrome window is then selected as a process window. At least one trial symbol related to at least one syndrome window other than the selected syndrome window is then mapped into the selected syndrome window. The number of non-zero terms in a trial error pattern corresponding to the mapped syndrome window is calculated. No further processing is implemented until all of the syndrome windows are selected and the number of non-zero terms in a trial error pattern corresponding to a mapped syndrome window is calculated.

Generally, a bit-oriented ECC or CRC is desired if expected errors are random bit errors and a byte-oriented ECC or CRC is desired if the expected errors are burst errors or random byte errors. In one aspect, the number of non-zero terms is determined on a bit basis. In another aspect, the number of non-zero terms is determined on a byte basis. For example, for sub-windows A and B that respectively include symbols 10100100 and f0000000, sub-window A is determined to include 3 error bits on a bit basis and 3 error bytes on a byte basis. Sub-window B is determined to include 4 error bits (f=1111) and 1 error byte. In determining an error location or error symbol, the total number of non-zero bits or bytes in a trial error pattern corresponding to a mapped syndrome window is calculated. When the calculation is done to all of the syndrome windows, a maximum likelihood analysis is applied for selecting at least one syndrome window corresponding to a trial error pattern including least non-zero bits or bytes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for detecting errors in data, comprising:
   encoding the data into a codeword using a generation polynomial;
   transmitting the codeword over a channel;
   receiving the transmitted codeword;
   generating syndromes for the received codeword using the generation polynomial, the syndromes comprising a plurality of syndrome symbols;
   providing a plurality of syndrome windows, each of the syndrome windows comprising a plurality of sub-windows and corresponding to a set of syndrome symbols;
   determining a number of non-zero terms of sub-windows of each of the syndrome windows; and
   selecting at least one syndrome window having a least number of non-zero terms of sub-windows.

2. The method of claim 1 comprising determining a number of non-zero bits of sub-windows of each of the syndrome windows, and selecting at least one syndrome window having a least number of non-zero bits of sub-windows.

3. The method of claim 1 comprising determining a number of non-zero bytes of sub-windows of each of the syndrome windows, and selecting at least one syndrome window having a least number of non-zero bytes of sub-windows.

4. The method of claim 1 comprising encoding the data into a codeword having N data symbols and K parity symbols, wherein N is an integer, and K is the highest degree of the generation polynomial.

5. The method of claim 4 comprising providing N+K syndrome windows for the codeword.

6. The method of claim 5 comprising providing each of the N+K syndrome windows with K sub-windows.

7. The method of claim 4 comprising providing N+1 syndrome windows for the codeword.

8. The method of claim 7 comprising providing each of the N+1 syndrome windows with K sub-windows.

9. A method for detecting errors in data, comprising:
   encoding the data into a codeword using a generation polynomial;
   transmitting the codeword over a channel;
   receiving the transmitted codeword;
   generating syndromes for the received codeword using the generation polynomial;
   providing a plurality of syndrome windows, each of the syndrome windows including a plurality of symbols and corresponding to an error pattern;
   selecting one of the syndrome windows;
   mapping into the selected syndrome window at least one symbol from at least one of the syndrome windows other than the selected syndrome window; and
   determining a number of non-zero terms in an error pattern corresponding to the mapped syndrome window.

10. The method of claim 9 comprising selecting another one of the syndrome windows, and mapping into the selected syndrome window at least one symbol from at least one of the syndrome windows other than the selected syndrome window.

11. The method of claim 10 comprising selecting at least one syndrome window corresponding to an error pattern having a least number of non-zero terms.

12. The method of claim 9 comprising determining a number of non-zero bits in an error pattern corresponding to the mapped syndrome window.

13. The method of claim 9 comprising determining a number of non-zero bytes in an error pattern corresponding to the mapped syndrome window.

14. The method of claim 9 comprising repeating the steps of selecting, mapping and determining until all of the syndrome windows are selected and mapped.

15. A method for detecting errors in a codeword, comprising:
   generating syndromes for the codeword using a generation polynomial;
   providing a plurality of syndrome windows, each of the syndrome windows including a plurality of symbols and corresponding to an error pattern;
   selecting one of the syndrome windows;
   mapping into the selected syndrome window at least one symbol from at least one of the syndrome windows other than the selected syndrome window;
   determining a number of non-zero terms in an error pattern corresponding to the mapped syndrome window; and
   repeating the steps of selecting, mapping and determining until all of the syndrome windows are selected and mapped.

16. The method of claim 15 comprising determining a number of non-zero bits in an error pattern corresponding to the mapped syndrome window.

17. The method of claim 15 comprising determining a number of non-zero bytes in an error pattern corresponding to the mapped syndrome window.

18. The method of claim 15 comprising selecting at least one syndrome window corresponding to an error pattern having a least number of non-zero terms.

19. The method of claim 16 comprising selecting at least one syndrome window corresponding to an error pattern having a least number of non-zero bits.

20. The method of claim 17 comprising selecting at least one syndrome window corresponding to an error pattern having a least number of non-zero bytes.

21. A system for detecting errors in data, comprising:
- an encoder for encoding the data into a codeword using a generation polynomial;
- a transmitter for transmitting the codeword over a channel;
- a receiver for receiving the transmitted codeword;
- a plurality of syndromes generated for the received codeword using the generation polynomial, the plurality of syndromes comprising a plurality of syndrome symbols; and
- a plurality of syndrome windows, each of the syndrome windows comprising a plurality of sub-windows and corresponding to a set of syndrome symbols;
- wherein a number of non-zero terms of sub-windows of each of the syndrome windows is determined.

22. The system of claim 21 wherein at least one syndrome window has a least number of non-zero terms of sub-windows.

23. The system of claim 21 wherein a number of non-zero bits of sub-windows of each of the syndrome windows is determined.

24. The system of claim 21 wherein at least one syndrome window has a least number of non-zero bits of sub-windows.

25. The system of claim 21 wherein a number of non-zero bytes of sub-windows of each of the syndrome windows is determined.

26. The system of claim 21 wherein at least one syndrome window has a least number of non-zero bytes of sub-windows.

27. The system of claim 21, the codeword comprising data symbols and parity symbols.

28. The system of claim 21, the codeword comprising N data symbols and K parity symbols, wherein N is an integer, and K is the highest degree of the generation polynomial.

29. The system of claim 28, the codeword comprising N+K syndrome windows.

30. The system of claim 28, the codeword comprising N+1 syndrome windows.

* * * * *